(12) United States Patent
Yoshida et al.

(10) Patent No.: US 7,933,949 B2
(45) Date of Patent: *Apr. 26, 2011

(54) DATA PROCESSING APPARATUS WHICH PREVENTS DATA OVERFLOW AND UNDERFLOW

(75) Inventors: Hideki Yoshida, Kanagawa (JP); Jin Sato, Tokyo (JP); Kazuyuki Ikeda, Tokyo (JP); Takashi Norizuki, Chiba (JP); Kenichi Sakusabe, Tokyo (JP); Daisuke Kawaguchi, Kanagawa (JP); Munehiro Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 328 days.

This patent is subject to a terminal disclaimer.

(21) Appl. No.: 12/113,431

(22) Filed: May 1, 2008

(65) Prior Publication Data

US 2008/0259213 A1 Oct. 23, 2008

Related U.S. Application Data

(63) Continuation of application No. 10/432,881, filed as application No. PCT/JP01/10367 on Nov. 28, 2001, now Pat. No. 7,389,318.

(30) Foreign Application Priority Data

Nov. 29, 2000 (JP) .................................. 2000-362562

(51) Int. Cl.
*G06F 15/16* (2006.01)
(52) U.S. Cl. ......................... 709/202; 709/247; 709/248

(58) Field of Classification Search .................. 709/205, 709/247, 248, 202
See application file for complete search history.

(56) References Cited

U.S. PATENT DOCUMENTS

| 5,565,924 | A | * | 10/1996 | Haskell et al. | 348/423.1 |
| 5,757,465 | A | * | 5/1998 | Seagrave et al. | 352/11 |
| 5,966,387 | A | * | 10/1999 | Cloutier | 370/516 |
| 7,389,318 | B2 | * | 6/2008 | Yoshida et al. | 709/200 |
| 2008/0109574 | A1 | * | 5/2008 | Holmes | 710/29 |

FOREIGN PATENT DOCUMENTS

EP 0 431 319 6/1991

(Continued)

OTHER PUBLICATIONS

Japanese Office Action dated Apr. 1, 2010.

*Primary Examiner* — Mohamed Wasel
(74) *Attorney, Agent, or Firm* — Frommer Lawrence & Haug LLP; William S. Frommer; Ellen Marcie Emas

(57) ABSTRACT

A data processing apparatus constitutes a low-cost audio/video data transmission and reception system. A reception buffer monitoring circuit 21 monitors the size of receiver data being accumulated in a reception buffer 6. When the size of accumulated data is found to become higher than a high threshold, the circuit 21 causes a reception clock generation circuit 8 to generate a reception clock with a higher frequency. When the accumulated data size becomes lower than a low threshold, the reception clock is generated with a lower frequency. Based on the reception clock fed from the reception clock generation circuit 8, an audio/video decoder 7 decodes the audio/video data coming from the reception buffer 6. The data processing apparatus applies advantageously to a television transmission and reception system for transmitting and receiving TV broadcast signals.

2 Claims, 10 Drawing Sheets

FOREIGN PATENT DOCUMENTS

| | | |
|---|---|---|
| EP | 0 797 325 | 9/1997 |
| JP | 08-063890 | 3/1996 |
| JP | 8-77691 | 3/1996 |
| JP | 08-275151 | 10/1996 |
| JP | 9-270779 | 10/1997 |
| JP | 11-112982 | 4/1999 |
| JP | 2000 69016 | 3/2000 |
| JP | 2000-224129 | 8/2000 |
| JP | 2001-320351 | 11/2001 |
| WO | WO 01 77852 | 10/2001 |

* cited by examiner

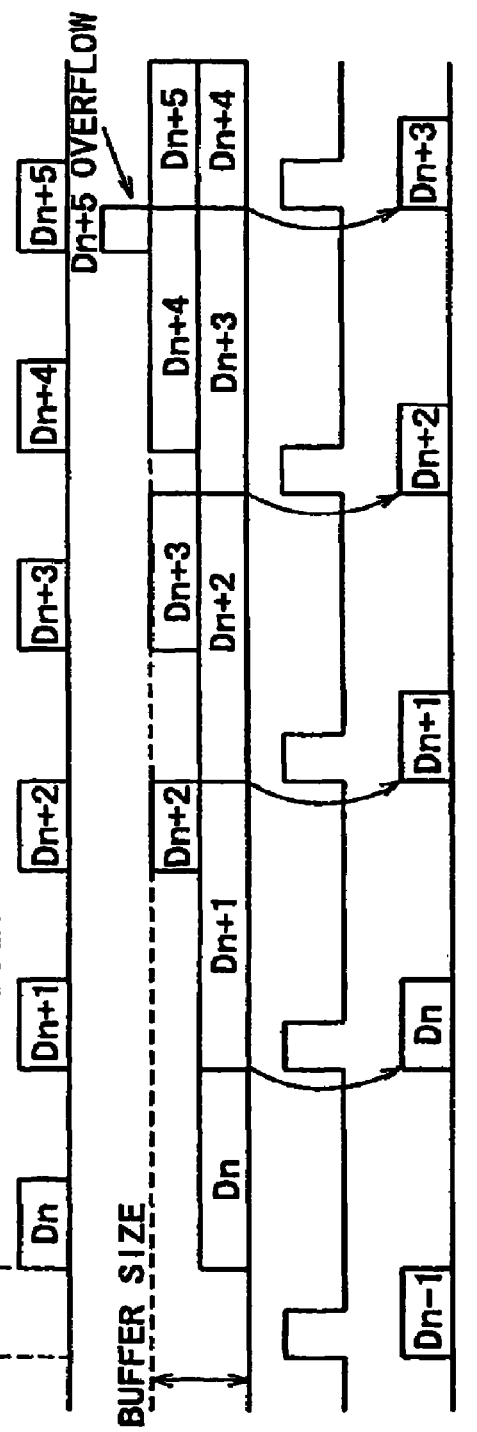

PRIOR ART

FIG. 3A
FIG. 3B
FIG. 3C
FIG. 3D
FIG. 3E
FIG. 3F

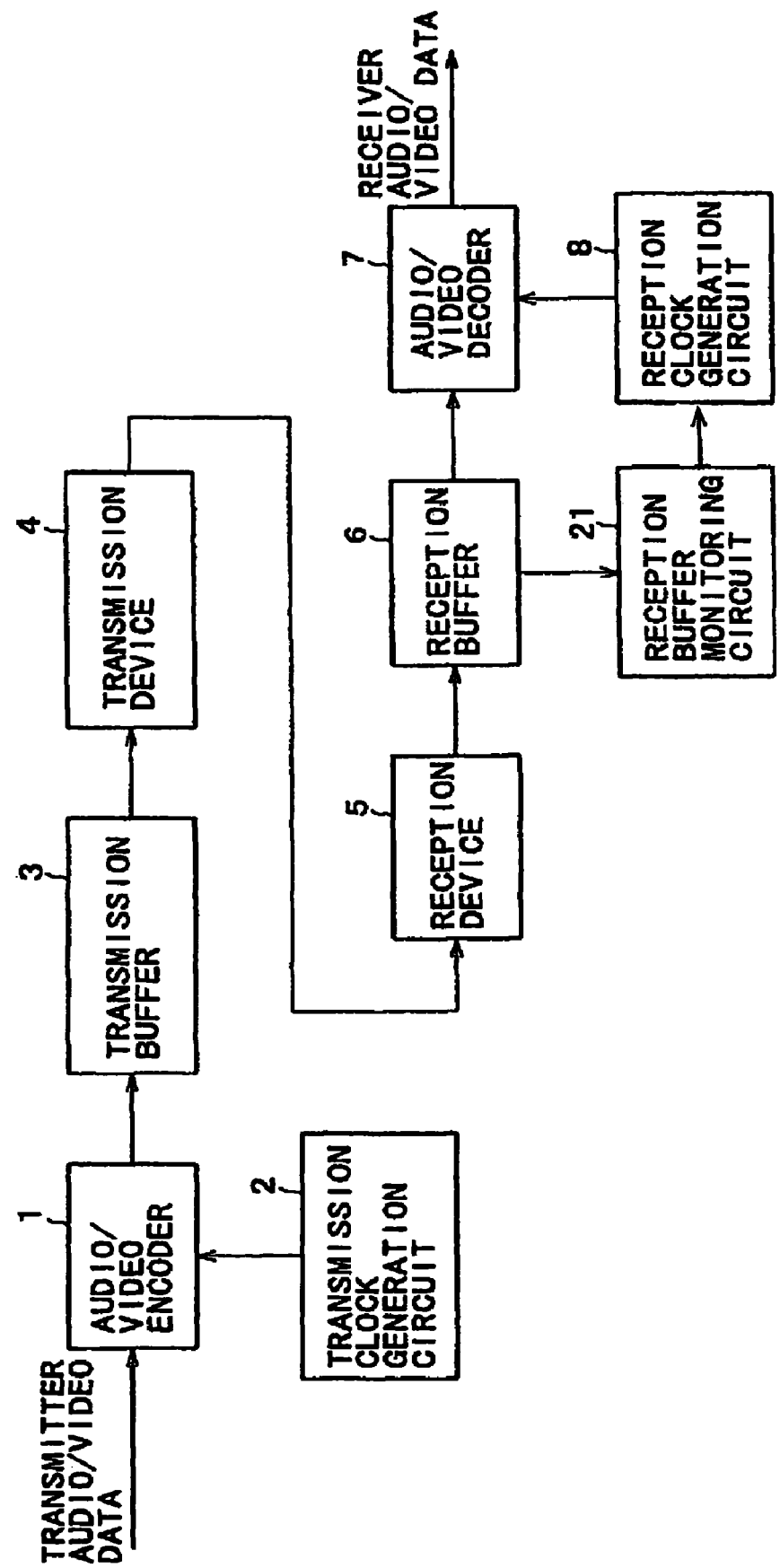

DATA PROCESSING APPARATUS WHICH PREVENTS DATA OVERFLOW AND UNDERFLOW

This is a continuation of application Ser. No. 10/432,881, filed Nov. 6, 2003 now U.S. Pat. No. 7,389,318, which is based on International Application PCT/JP01/10367 filed Nov. 28, 2001, pursuant to 35 USC 371, and is entitled to the priority filing date of Japanese application 2000-362562 filed in Japan on Nov. 29, 2000, the entirety of which is incorporated herein by reference.

TECHNICAL FIELD

The present invention relates to a data processing apparatus and, more particularly, to a data processing apparatus which is simply structured to process data.

BACKGROUND ART

FIG. 1 shows an overall configuration of a conventional audio/video data transmission and reception system. On the transmitting side, transmitter audio/video data to be sent out are input to an audio/video encoder 1. In turn, the audio/video encoder 1 compresses the input transmitter audio/video data illustratively in MPEG format based on a clock frequency generated by a transmission clock generation circuit 2 such as a crystal oscillator. The compressed data are accumulated in a transmission buffer 3 to absorb clock frequency differences. Every time a transmission device 4 sends data to a reception device 5, the transmission buffer 3 replenishes the transmission device 4 with more data. Before transmission, the transmission device 4 subjects the transmitter data to such processes as code conversion and modulation.

On the receiving side, the reception device 5 receives the transmitter data from the transmission device 4 and restores the original data by subjecting the received data to such processes as demodulation and decoding. The restored data are accumulated in a reception buffer 6. It is assumed that the data transfer rate between the transmission device 4 and the reception device 5 is sufficiently higher than the transfer rate of the audio/video data. From the reception buffer 6, the data are forwarded to an audio/video decoder 7 in properly timed relation with processing of the latter. The audio/video decoder 7 decodes (i.e., decompresses) the data in accordance with a clock frequency generated by a reception clock generation circuit 8.

With the system in FIG. 1, it is difficult to keep the transmission clock frequency input to the audio/video encoder 1 exactly the same as the reception clock frequency entered into the audio/video decoder 7 because of variations in component parameters incurred during manufacturing. The resulting difference in processing speeds causes data overflows and underflows in the reception buffer 6, as will be discussed later with reference to FIGS. 2A through 2F and 3A through 3F. The fluctuating flow of data causes the audio/video decoder 7 to develop irregularities in reproducing the video or audio data.

FIGS. 2A through 2F illustrate how a data overflow occurs. An audio/video encoder synchronizing clock (FIG. 2A) is generated internally by the audio/video encoder 1 in keeping with the transmission clock generated by the transmission clock generation circuit 2. In synchronism with leading edges of the clock, encoded audio/video data Dn (FIG. 2B) of a fixed length each are accumulated in the transmission buffer 3 (of a two-packet size).

Transmitter data Dn are received by the reception device 5 following a predetermined transmission delay (FIG. 2C) and are accumulated in the reception buffer 6 (FIG. 2D). Receiver data Dn are forwarded from the reception buffer 6 to the audio/video decoder 7 (FIG. 2F) whereby the data are decoded and output as receiver audio/video data.

An audio/video decoder synchronizing clock (FIG. 2E) is generated internally by the audio/video decoder 7 in accordance with the reception clock generated by the reception clock generation circuit 8. The data input in synchronism with each leading edge of the clock are decoded by the audio/video decoder 7. In this example, the audio/video decoder synchronizing clock (FIG. 2E) is lower in frequency than the audio/video encoder synchronizing clock (FIG. 2A), so that a data overflow takes place when receiver data Dn+5 are placed into the reception buffer 6.

Figures 3A, 3B, 3C, 3D, 3E, 3F:
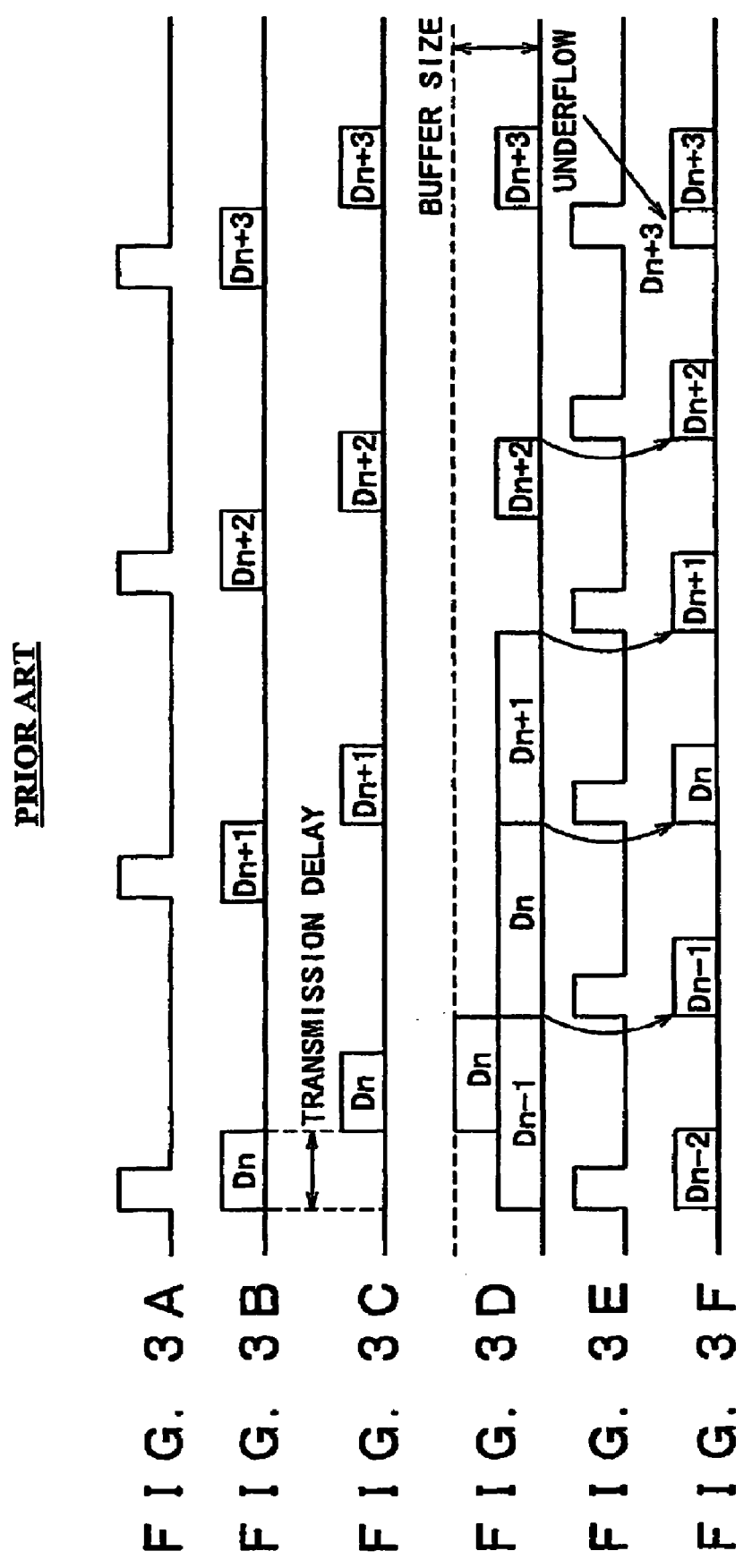

FIGS. 3A through 3F depict how a data underflow occurs. Audio/video data are processed in the same manner as with the case in FIGS. 2A through 2F. In this example, the audio/video decoder synchronizing clock (FIG. 3E) is higher in frequency than the audio/video encoder synchronizing clock (FIG. 3A), so that the reception buffer 6 is vacated before the reception of subsequent receiver data Dn+3 (FIG. 3D). With the reception buffer 6 incapable of transferring data to the audio/video decoder 7 at a leading edge of the audio/video decoder synchronizing clock (FIG. 3F), a data underflow takes place.

DISCLOSURE OF INVENTION

The present invention has been made in view of the above circumstances and provides a data processing apparatus that constitutes a simply structured, low-cost system capable of preventing data overflows and underflows.

In carrying out the invention and according to a first aspect thereof, there is provided a data processing apparatus including: a receiving element for receiving data; a storing element for storing data received by the receiving element; a processing element for processing the data received by the receiving element; a clock generating element for generating a clock for use by the processing element processing the data received by the receiving element; and a controlling element for controlling a frequency of the clock generated by the clock generating element in accordance with a size of data stored by the storing element.

In one preferred structure according to the first aspect of the invention, the processing element may decode the data received by the receiving element.

In another preferred structure according to the first aspect of the invention, if the size of data is higher than a first reference value, then the controlling element may raise the clock frequency; and if the size of data is lower than a second reference value, then the controlling element may lower the clock frequency.

In a further preferred structure according to the first aspect of the invention, the data processing apparatus may further include a separating element for separating the data received by the receiving element into a first data item and a second data item; wherein the storing element may include: a first storing element for storing the first data item; and a second storing element for storing the second data item; and wherein the processing element may include: a first processing element for processing the first data item; and a second processing element for processing the second data item.

In an even further preferred structure according to the first aspect of the invention, if there occurs a difference in total processing time between a transmission block and a reception block handling the first data item and the second data item, and if Buf1 is assumed to denote a data size processible by the first processing element and Bfu2 to represent an average value of the first reference value and the second reference value, then the controlling element may cause a center value of a controllable range of data sizes accommodated by the first storing element to correspond to a sum of Buf1 and Buf2.

In a still further preferred structure according to the first aspect of the invention, the first data item and the second data item may be made up of an audio data item and a video data item respectively.

According to a second aspect of the invention, there is provided a data processing method including the steps of: receiving data; storing data received in the receiving step; processing the data received in the receiving step; generating a clock for use in the processing step processing the data received in the receiving step; and controlling a frequency of the clock generated in the clock generating step in accordance with a size of data stored in the storing step.

According to a third aspect of the invention, there is provided a recording medium which stores a program readable by a computer, the program including the steps of: receiving data; storing data received in the receiving step; processing the data received in the receiving step; generating a clock for use in the processing step processing the data received in the receiving step; and controlling a frequency of the clock generated in the clock generating step in accordance with a size of data stored in the storing step.

The data processing apparatus of this invention is characterized in that the clock frequency is controlled in accordance with the size of the data being held in the apparatus.

BRIEF DESCRIPTION OF DRAWINGS

FIGS. 2A through 2F are explanatory views depicting how a data overflow occurs in the system of FIG. 1;

FIGS. 3A through 3F are explanatory views illustrating how a data underflow takes place in the system of FIG. 1;

FIG. 4 is a block diagram indicating a typical configuration of an audio/video data transmission and reception system embodying the invention;

BEST MODE FOR CARRYING OUT THE INVENTION

FIG. 4 shows a typical configuration of an audio/video data transmission and reception system practiced as a first embodiment of this invention. This system is basically the same in configuration as the conventional system indicated in FIG. 1. The major difference is that the system of FIG. 4 is supplemented with a reception buffer monitoring circuit 21 and that the reception clock generation circuit 8 controls the frequency of the generated clock based on the output of the reception buffer monitoring circuit 21. The other components and their functions are the same as those in the system of FIG. 1.

Figure 1:
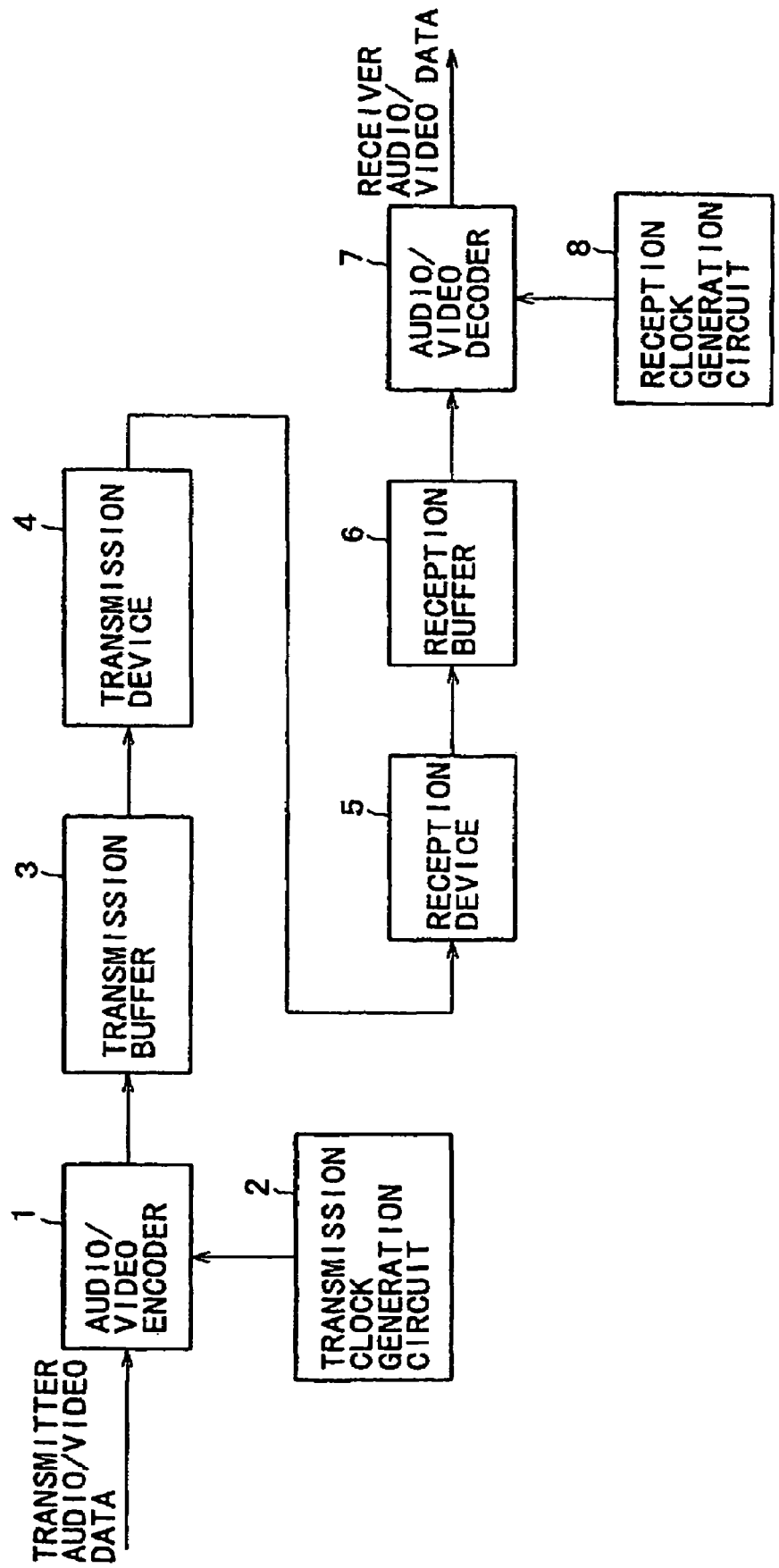
FIG. 1 is a block diagram showing a typical configuration of a conventional audio/video data transmission and reception system.

The basic workings of the system in FIG. 4 are the same as those of the system in FIG. 1 and thus will not be described further. The inventive system differs from the system of FIG. 1 in terms of how to generate the reception clock. This aspect of the invention is described below in more detail.

The reception buffer monitoring circuit 21 monitors the size of data being accumulated in the reception buffer 6. When the data size exceeds a predetermined level, the reception clock generation circuit 8, for example, raises the frequency of the clock generated per field or per frame. When the data size becomes lower than a predetermined level, the reception clock generation circuit 8 generates the clock with a lower frequency.

One way in which the reception clock generation circuit 8 varies the frequency of the clock it generates is by using a voltage controlled oscillator (VCO). Another way to vary the clock frequency is by getting a counter to count a clock with frequencies higher than the frequency of the clock fed to the audio/video decoder 7 so as to vary the counter value for clock generation.

Figure 5:
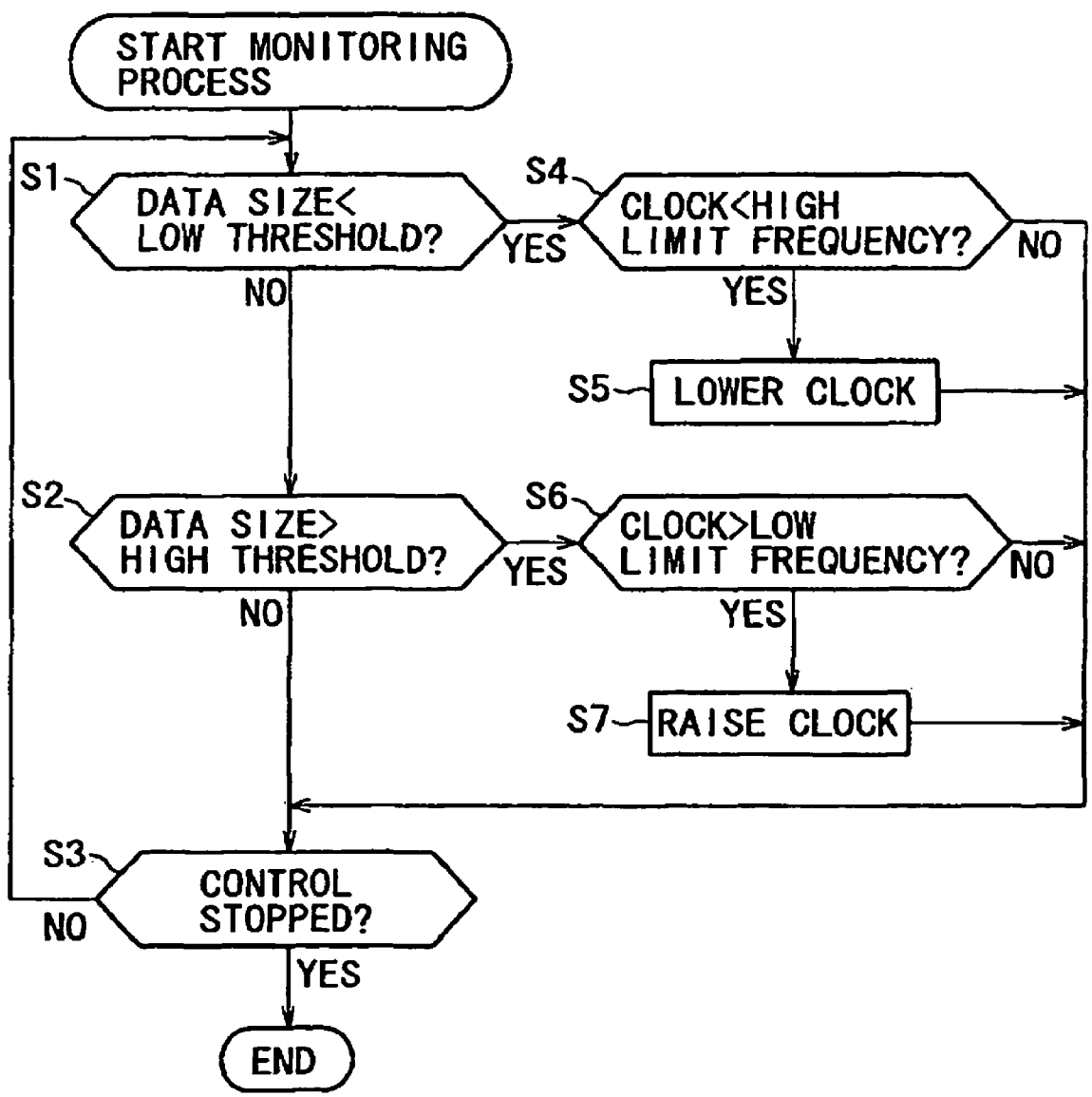
FIG. 5 is a flowchart of steps performed by the system of FIG. 4.

FIG. 5 is a flowchart of actual control steps carried out by the reception buffer monitoring circuit 21. In step S1, a check is made to see if the size of data accumulated in the reception buffer 6 is lower than a predetermined low threshold. If the buffered data size is judged to be lower than the low threshold, step S4 is reached and a check is made to see if the clock frequency is lower than a predetermined high limit frequency. If the clock frequency is judged lower than the high limit frequency, then step S5 is reached in which the clock frequency is lowered. If the size of data accumulated in the reception buffer 6 is judged to be higher than the low threshold in step S1, then step S2 is reached and a check is made to see if the data size is higher than a predetermined high threshold. If the data size is judged to be higher than the high threshold in step S2, step S6 is reached and a check is made to see if the clock frequency is higher than a predetermined low limit frequency. If the clock frequency is judged higher than the low limit frequency in step S6, then step S7 is reached in which the clock frequency is raised. Nothing is carried out when the size of data accumulated in the reception buffer 6 falls within the range between the low threshold and the high threshold. The high and low limit frequencies of the clock are determined in a manner meeting the following conditions:

(1) that the frequency should not exceed a clock range in which the audio/video decoder operates;
(2) that the size of data in the buffer should not wildly fluctuate; and
(3) that continued system performance should be ensured under abnormal conditions (e.g., where data fail to come in).

In step S3, a check is made to see a control stop command is issued. If the command is not judged to be issued, step S1 is reached again and the subsequent steps are repeated. If the control stop command is judged to be issued in step S3, then the process is brought to an end.

Figure 6:
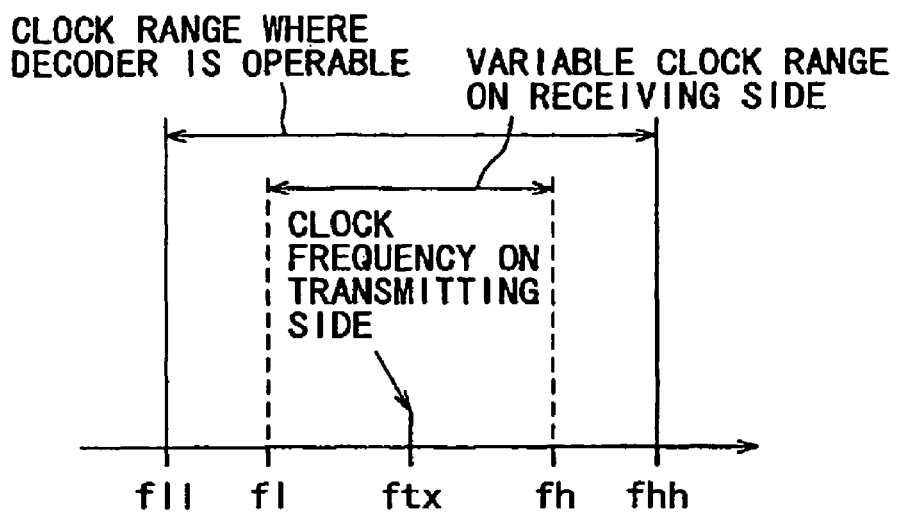
FIG. 6 is an explanatory view sketching frequencies of a reception clock generated by a reception clock generation circuit included in FIG. 4.

FIG. 6 depicts relations between the clock input to the audio/video encoder 1 on the one hand and the clock entered into the audio/video decoder 7 on the other hand. It is assumed here that ftx stands for the clock input to the audio/video encoder 1 and frx for the clock entered into the audio/video decoder 7. The clock generated by the reception clock generation circuit 8 and input to the audio/video decoder 7 is controlled within the range between a low limit clock frequency (fl) and a high limit clock frequency (fh) by the reception buffer monitoring circuit 21. The audio/video decoder 7 is assumed to operate with its frequency frx in a range between fll and fhh. It is thus required that the frequencies fl and fh fall within the above range, that the low limit clock frequency fl be lower than the clock ftx, and that the clock ftx be lower than the high limit clock frequency fh.

Figure 7:
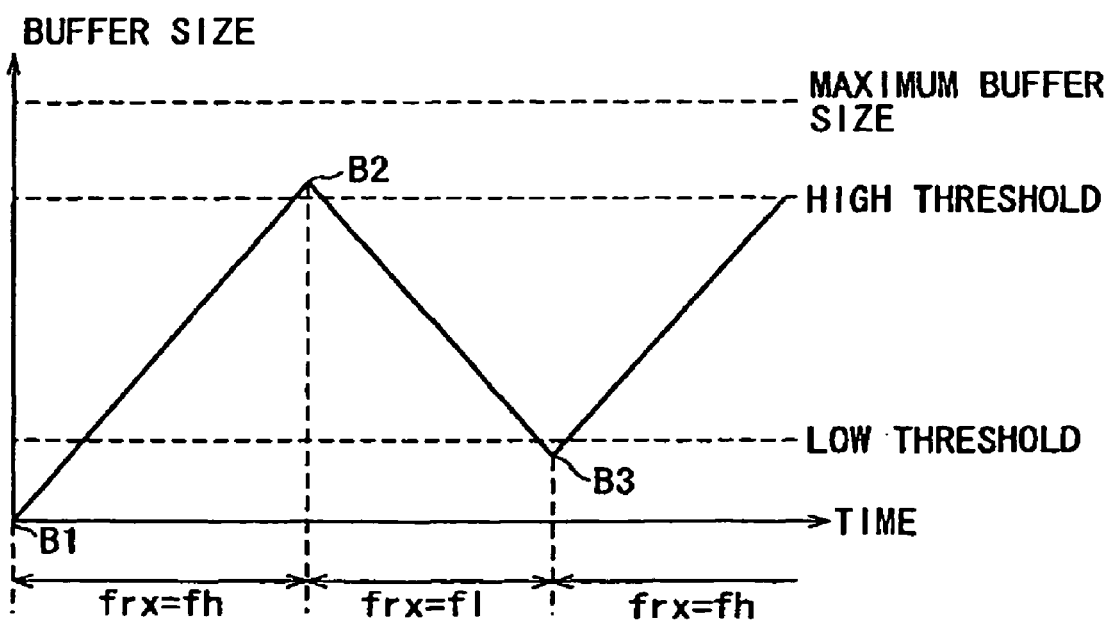
FIG. 7 is an explanatory view graphically showing sizes of data accumulated in a reception buffer included in FIG. 4.

FIG. 7 graphically depicts how data sizes in the reception buffer 6 vary over time. In this example, as shown in FIG. 6, when the clock is to be raised, it is brought up to the high limit clock frequency fh; when the clock is to be lowered, it is brought down to the low limit clock frequency fl. In an initial state B1 where the reception buffer 6 is empty, the clock frx is brought up to the high limit clock frequency fh so as to let data accumulate in the buffer 6. Later at a point B2 where the size of data in the reception buffer 6 exceeds the high threshold, the clock frx is judged to be in need of a reduction. The clock frx is then brought down to the low limit clock frequency fl. At a subsequent point B3 where the data size becomes lower than the low threshold, the clock frx is judged to be in need of an increase. The clock frx is then brought up again to the high limit clock frequency fh. These steps are repeated as described.

Figure 8:
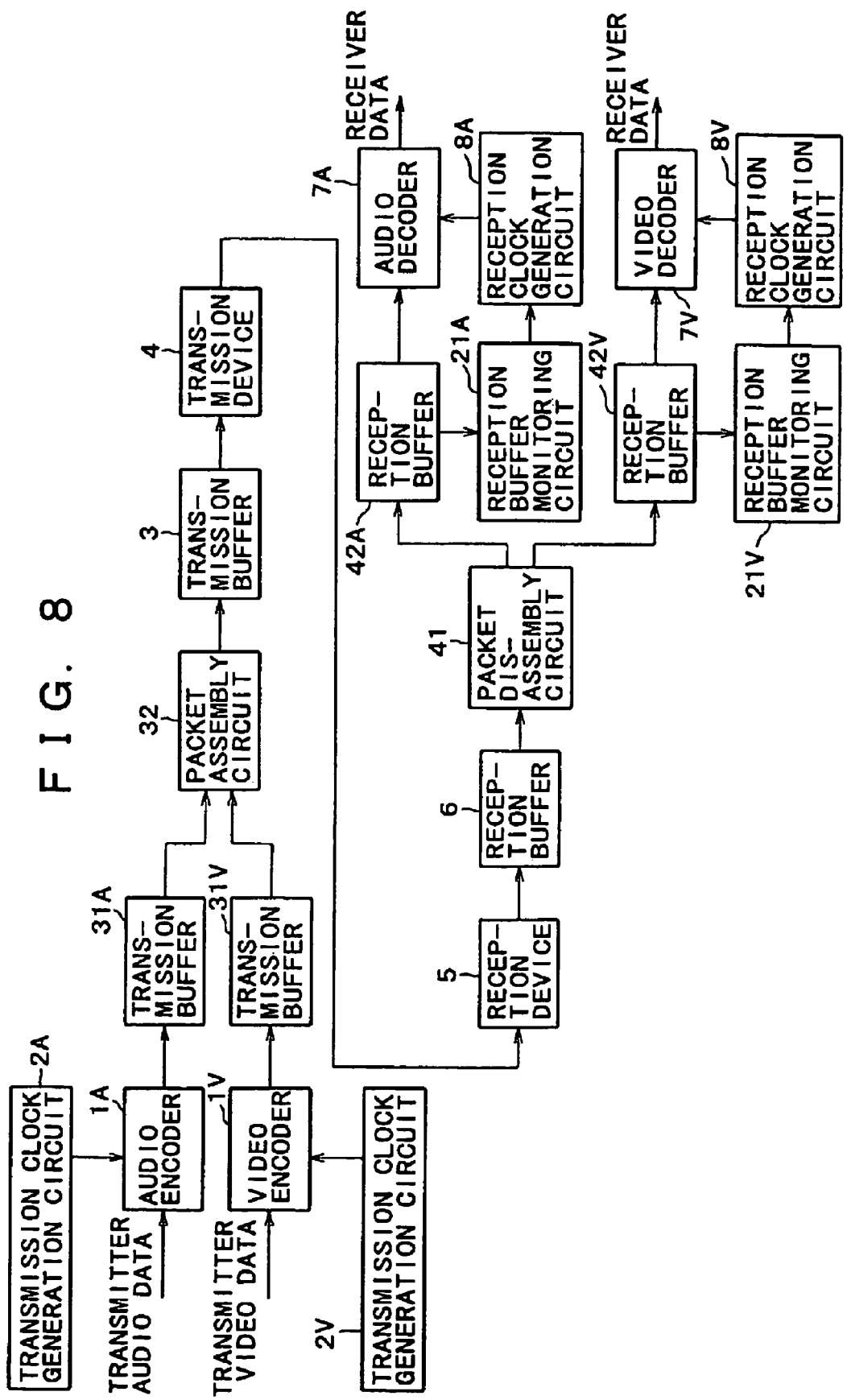
FIG. 8 is a block diagram depicting a typical configuration of another audio/video data transmission and reception system embodying the invention.

FIG. 8 shows a typical configuration of another audio/video data transmission and reception system practiced as a second embodiment of this invention. With this embodiment, the audio/video encoder 1 on the transmitting side is constituted by an audio encoder 1A and a video encoder 1V. Correspondingly, the transmission clock generation circuit 2 is made up of a transmission clock generation circuit 2A and a transmission clock generation circuit 2V. The output of the audio encoder 1A is fed to a packet assembly circuit 32 via a transmission buffer 31A. The output of the video encoder 1V is sent to the packet assembly circuit 32 through a transmission buffer 31V.

On the receiving side, a packet disassembly circuit 41 is furnished corresponding to the packet assembly circuit 32 installed on the transmitting side. The packet disassembly circuit 41 disassembles data received from the reception buffer 6 into an audio packet and a video packet. The audio packet is output to an audio decoder 7A via a reception buffer 42A and the video packet is sent to a video decoder 7V through a reception buffer 42V.

The reception buffer 21 includes reception buffer monitoring circuits 21A and 21V. The reception buffer monitoring circuit 21A monitors the output from the reception buffer 42A, while the reception buffer monitoring circuit 21V monitors the size of data held in the reception buffer 42V. The reception clock generation circuit 8 comprises reception clock generation circuits 8A and 8V. The reception clock generation circuit 8A generates a reception clock based on the output of the reception buffer monitoring circuit 21A and outputs the generated clock to the audio decoder 7A. The reception clock generation circuit 8V generates a reception clock based on the output of the reception buffer monitoring circuit 21V and sends the generated clock to the video decoder 7V.

The other components and their functions are the same as those in the system of FIG. 4.

The audio encoder 1A compresses the input transmitter data (audio data) illustratively in MPEG format and hands the compressed data over to the transmission buffer 31A. The audio encoder 1A acts in keeping with a transmission clock generated by the transmission clock generation circuit 2A. The video encoder 1V operating in keeping with a transmission clock generated by the transmission clock generation circuit 2V compresses the transmitter data (video data) illustratively in MPEG format and transfers the compressed data to the transmission buffer 31V. The package assembly circuit 32 assembles transmitter packets by multiplexing the audio and video data from the transmission buffers 31A and 31V and by supplementing the result of the multiplexing with header information or the like needed by the receiving side to disassemble the packets. The assembled transmitter packets are accumulated in the transmission buffer 3. Every time the transmission device 4 sends data, it is supplied with the next data from the transmission buffer 3.

On the receiving side, the reception device 5 receives data and accumulates the data in the reception buffer 6. The packet disassembly circuit 41 disassembles the buffered data into audio data and video data which are transferred to the reception buffers 42A and 42V respectively. In an audio block, the reception buffer monitoring circuit 21A varies the frequency of the clock generated by the reception clock generation circuit 8A in keeping with the size of the data held in the reception buffer 42A. Based on the clock from the reception clock generation circuit 8A, the audio decoder 7A decodes the received audio data and outputs the decoded data as receiver data.

In a video block, the reception buffer monitoring circuit 21V similarly varies the frequency of the clock generated by the reception clock generation circuit 8V in accordance with the size of the data retained in the reception buffer 42V. With this embodiment, audio data and video data are separately processed by the encoders 1A and 1V and by the decoders 7A and 7V, respectively. Because the audio and video data go through different processing paths and are subject to differences in processing time, the receiving side is required to synchronize the two kinds of data in delay time.

Figure 9:
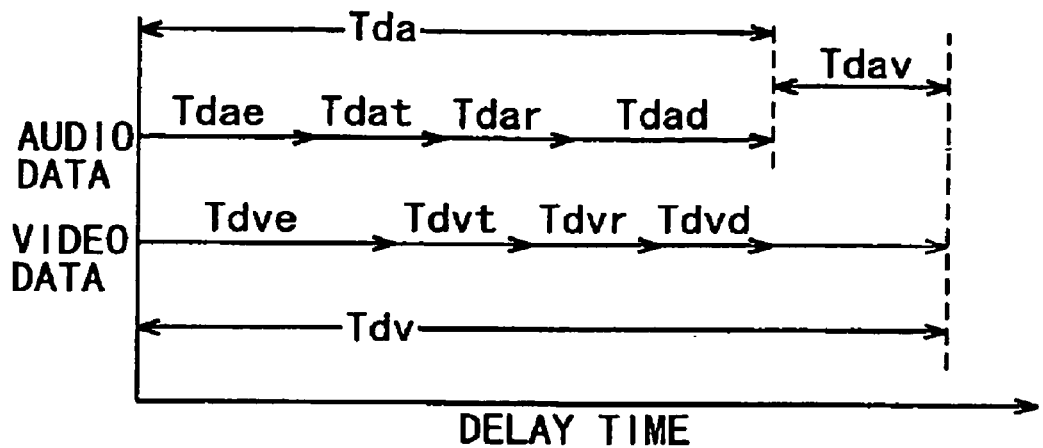
FIG. 9 is an explanatory view indicating differences in delay time between audio data and video data handled by the system of FIG. 8.

FIG. 9 schematically indicates typical differences in delay time between audio data and video data handled by the audio and video blocks respectively. It is assumed here that transmitter data are input to the audio encoder 1A and video encoder 1V in synchronism. Along their processing path, the audio data are subject to a total delay time (Tda) which, except for delays in common with the video data, is made up of a delay time (Tdae) at the audio encoder 1A, a delay time (Tdat) at the transmission buffer 31A, a delay time (Tdar) at the reception buffer 42A, and a delay time (Tdad) at the audio decoder 7A. The delay time (Tdar) at the reception buffer 42A is defined as a delay time in effect at the average value (ABufAve) of the low threshold (in step S1 of FIG. 5) and the high threshold (in step S2 of FIG. 5) for the audio data.

Along their processing path, the video data are subject to a total delay time (Tdv) which, except for delays in common with the audio data, is composed of a delay time (Tdve) at the video encoder 1V, a delay time (Tdvt) at the transmission buffer 31V, a delay time (Tdvr) at the reception buffer 42V, and a delay time (Tdvd) at the video decoder 7V. The delay time (Tdvr) at the reception buffer 42V is defined as a delay time in effect at the average value (VBufAve) of the low threshold (in step S1 of FIG. 5) and the high threshold (in step S2 of FIG. 5) for the video data. In this example, the video data have a longer processing path than the audio data, which translates into a longer processing time for the video data (i.e., Tda<Tdv); the difference in processing time is Tdav between the audio data and the video data.

To synchronize the audio data with the video data requires delaying the processing of the audio data by the time period Tdav. That delay is brought about by setting suitable thresholds on the size of the data accumulated in the reception buffer 42A. More specifically, if the size of audio data processed in the time period Tdav is represented by ABufTdav, then the audio and video data may be synchronized by setting the center value of the accumulated audio data size as the size ABufTdav plus the average value ABufAve mentioned above. The high and low thresholds may then be set above and below that center value respectively.

Although the second embodiment is designed to have the difference in delay time between the audio and the video data all compensated on the receiving side, this is not limitative of the invention. Alternatively, the buffers on the transmitting side may be arranged to absorb some of the delay time difference. Whereas both the audio and the video blocks possess clock adjusting capabilities in the second embodiment, they are not mandatory for a system where synchronism between audio and video data matters little. In that kind of system, the clock adjusting function need only be furnished in either the audio block or the video block.

Figure 10:
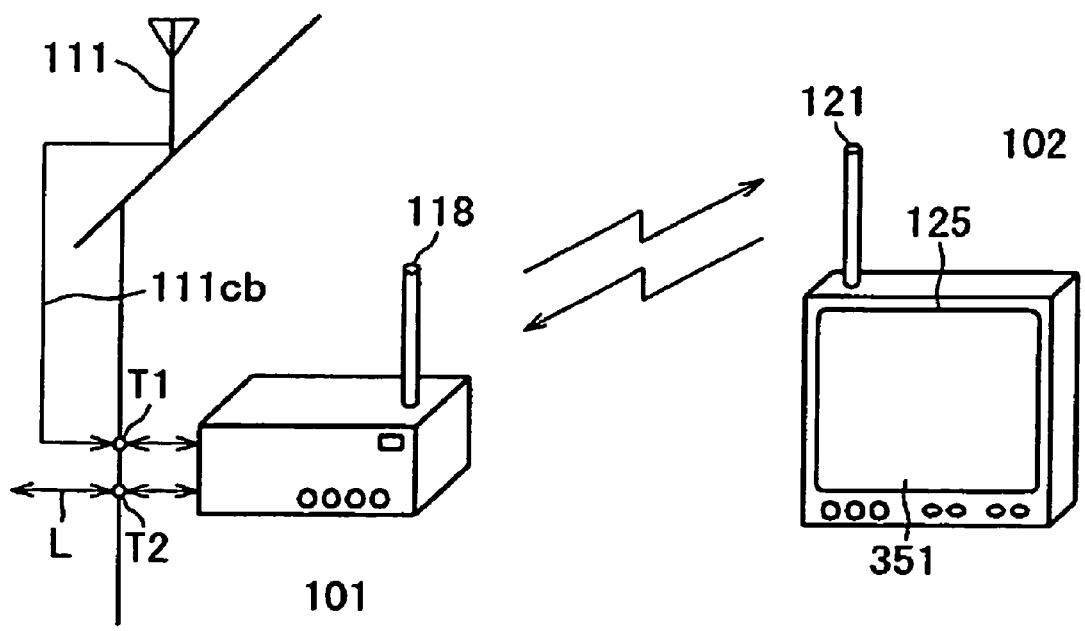
FIG. 10 is a schematic view sketching a typical setup of the inventive system.

FIG. 10 schematically sketches a typical setup of the inventive system in FIG. 4. This setup is a TV reception system that includes a channel selection device 101 and a display device 102 interconnected wirelessly, as shown in FIG. 10. The channel selection device 101 fabricated according to this invention is illustratively set up indoors in the household. The display device 102 also fabricated according to this invention is employed by the user at his or her side.

As shown in FIG. 10, the channel selection device 101 is connected to an antenna cable 111cb which is led into the household from the outside where the cable is connected to an outdoor receiver antenna 111 for receiving TV broadcast signals. The channel selection device 101 is also connected to a telephone line L which is led into the household from the outside where the line is linked to a telephone network.

A TV broadcast signal selected after reception by the antenna 111 is demodulated by the channel selection device 101. The demodulated signal is sent wirelessly through a transmitter/receiver antenna 118 to the display device 102. In addition, signals transmitted over the telephone line L may be received, selected and decoded by the channel selection device 101. The decoded signal is likewise sent wirelessly via the transmitter/receiver antenna 118 to the display device 102.

The channel selection device 101 is also capable of receiving transmitter information such as instructions and e-mails from the display device 102 through the transmitter/receiver antenna 118. Based on the received instructions, the channel selection device 101 may change TV broadcast signals for a new program selection or send the transmitter information over the telephone line L.

The display device 102 receives the TV broadcast signal sent wirelessly from the channel selection device 101. On receiving the signal, the display device 102 causes pictures represented by the video signal contained in the received signal to appear on the screen of an LCD (liquid crystal display) 125. At the same time, the sound corresponding to the audio signal contained in the received signal is produced by speakers, so that the user viewing the display screen can enjoy the desired TV program.

The display device 102 also receives signals representing e-mails and Internet website pages which were received by the channel selection device 101 over the telephone line L and have been wirelessly transmitted therefrom. The display device 102 generates display signals based on the received signals and causes the LCD 125 to present the user with a display of pictures corresponding to the generated display signals.

Furthermore, a touch panel 351 is attached to the display screen of the LCD 125 on the display device 102. With information displayed on the LCD 125, the user may touch on the touch panel 351 as needed to enter instructions into the system. The touch panel 351 is also used by the user in preparing and sending outgoing e-mails as well as receiving and opening incoming e-mails addressed to the user.

As described, the channel selection device 101 acts as an interface to admit TV broadcast signals and diverse kinds of information offered over the telephone line L into the TV reception system of this invention, and to forward information from the inventive system onto a communication network through the telephone line L. The display device 102 works as a user interface to provide the user with information admitted into the TV reception system through the channel selection device 101 as well as to accept information entered by the user.

As shown in FIG. 10, the channel selection device 101 is installed in such a manner that it can be coupled securely to terminals T1 and T2 connecting to the antennal cable 111cb and telephone line L respectively, wherever the terminals are located. Since the channel selection device 101 and display device 102 are interconnected wirelessly as illustrated, the display device 102 may be installed in any area where radio signals from the channel selection device 101 can be received. The setup thus allows the user to enjoy desired TV programs and use e-mails through an Internet connection at locations appreciably freed from conventional installation constraints.

Figure 11:
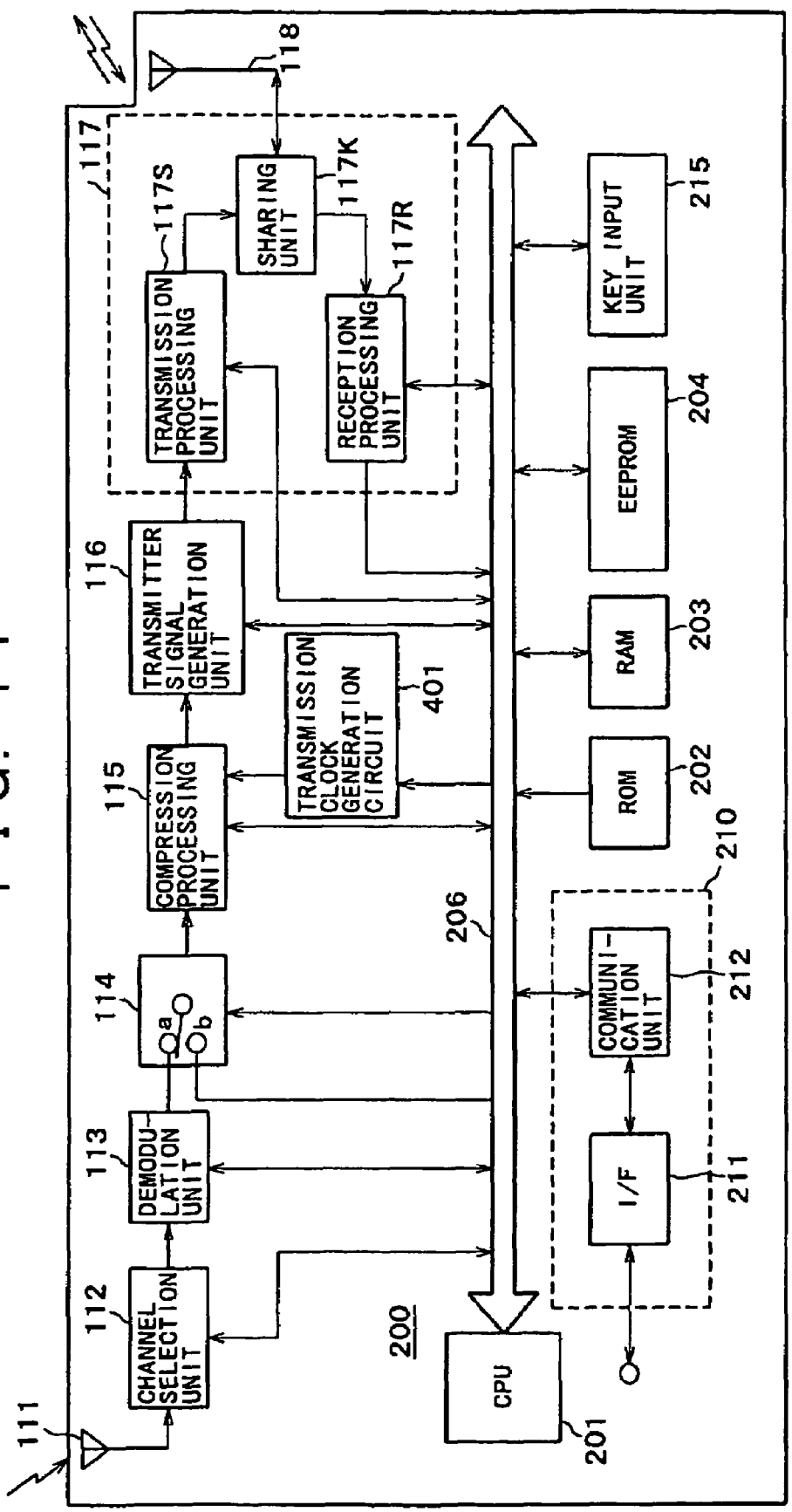
FIG. 11 is a block diagram showing a typical structure of a channel selection device included in the setup of FIG. 10.

FIG. 11 is a block diagram showing a more detailed structure of the channel selection device 101. The components of the channel selection device 101 are placed under control of a control unit 200.

The control unit 200, as shown in FIG. 11, is a microcomputer that comprises a CPU (central processing unit) 201, a ROM (read only memory) 202, a RAM (random access memory) 203, and an EEPROM (electrically erasable programmable read only memory) 204, all interconnected via a CPU bus 206.

The ROM 202 accommodates various processing programs executed by the channel selection device 101 as well as data needed for the program execution. The RAM 203 serves primarily as a work area in which the data obtained from various processes are retained temporarily.

The EEPROM 204 is a nonvolatile memory that retains the information held therein even when power is removed. For example, the EEPROM 204 may be used to implement what is known as a last channel memory function. This function involves keeping information about the broadcast channel being selected just before the main power supply of the channel selection device 101 was switched off, and allowing the last-selected channel to be automatically selected when power is restored.

As depicted in FIG. 11, the channel selection device 101 of this embodiment has a channel selection unit 112 connected to the antenna cable 111cb coming from the outdoor receiver antenna 111 for receiving TV broadcast signals. The TV broadcast signals received by the receiver antenna 111 are supplied to the channel selection unit 112.

Out of those TV broadcast signals coming from the receiver antenna 111, the channel selection unit 112 selects the TV broadcast signal corresponding to a channel selection instruction signal sent from the control unit 200. The selected TV broadcast signal is fed to a demodulation unit 113. The demodulation unit 113 demodulates the supplied TV broadcast signal and sends the demodulated signal (i.e., TV program signal) to an input terminal "a" of a switching circuit 114.

The switching circuit 114, switched by a switching control signal from the control unit 200, allows TV program signals from the demodulation unit 113 or signals from the control unit 200 to reach an input terminal "a" or an input terminal "b" respectively. The signals sent from the control unit 200 to the switching circuit 114 are constituted by e-mails and Internet website pages which have reached the channel selection device 101 over the telephone line L and which are received through a modem 210.

The signal output from the switching circuit 114 is supplied to a compression processing unit 115. The compression processing unit 115 compresses the supplied signal using a predetermined compression format such as the MPEG (Moving Picture Expert Group) or Wavelet format.

A transmission clock generation circuit 401 placed under control of the CPU 201 generates a transmission clock and supplies the generated clock to the compression processing unit 115. The compressing processing unit 115 performs the above-described compression process in synchronism with the transmission clock.

The signal compressed by the compression processing unit 115 is fed to a transmitter signal generation unit 116. In turn, the transmitter signal generation unit 116 generates a transmitter signal based on a predetermined communication protocol. With this embodiment, the transmitter signal is generated on the basis of IEEE (Institute of Electrical and Electronics Engineers) 802.11 or other protocols derived therefrom.

The transmitter signal generated by the transmitter signal generation unit 116 is sent to a transmission processing unit 117S of wireless section 117. The transmission processing unit 117S modulates and amplifies the transmitter signal in keeping with control signals from the control unit 200. The transmitter signal processed by the transmission processing unit 117S is transmitted wirelessly through a sharing unit 117K and from the transmitter/receiver antenna 118.

The sharing unit 117K is provided to prevent interference between transmitter and receiver signals. As described earlier, the channel selection device 101 of this embodiment is structured to receive through the transmitter/receiver antenna 118 instruction information sent wirelessly from the display device 102. The sharing unit 117K acts to keep the transmitter signal from the transmission processing unit 117S from interfering with the receiver signal received through the same antenna 118.

Signals such as channel selection instructions received from the display device 102 via the transmitter/receiver antenna 118 are forwarded to a reception processing unit 117R via the sharing unit 117K. The reception processing unit 117R subjects the supplied signals to such processes as demodulation to turn the signals into a format that can be handled by the control unit 200. The signals thus processed are sent to the control unit 200.

If the signal received from the reception control unit 117R is instruction information such as channel selection instructions, then the control unit 200 causes the relevant components to act accordingly. More specifically, if the signal sent from the reception processing unit 117R to the control unit 200 turns out to be a channel selection instruction, then the control unit 200 supplies the channel selection unit 112 with a corresponding channel selection signal to select the designated TV broadcast signal.

If the signal sent from the reception processing unit 117R to the control unit 200 turns out to be transmitter information such as an e-mail, then the control unit 200 establishes connection with the telephone network through the modem 210 and telephone line L, as will be described later, and outputs the transmitter information over the connected telephone network to a designated destination.

As shown in FIG. 11, the modem 210 includes an interface (I/F) unit 211 and a communication unit 212. The interface unit 211 interfaces the channel selection device 101 with a communication line connected to the destination through the telephone network. The interface unit 211 receives signals coming over the telephone line L and transmits signals from the channel selection unit 101 over the same line L.

The communication unit 212 decodes the signal received through the interface unit 211 and supplies the decoded signal to the control unit 200. The communication unit 212 further encodes the transmitter signal from the control unit 200 and supplies the encoded signal to the interface unit 211. In this manner, various kinds of data are exchanged with the destination to which the telephone line L is connected.

As mentioned above, the channel selection device 101 of this embodiment is capable of connecting to the Internet through the modem 210, telephone line L, and a suitable ISP (Internet Service Provider). The channel selection device 101, once connected to the Internet, can obtain various kinds of information as well as send and receive e-mails through the Internet connection.

The control unit 200 is capable of causing the modem 210 to go off-hook and on-hook. Furnished with a so-called dialer function, the control unit 200 may cause the modem 210 to go off-hook and send a dial signal over the telephone line L.

As illustrated in FIG. 11, the control unit 200 is connected to a key input unit 215 having a power on/off key and diverse setting keys. Equipped with these keys, the key input unit 215 allows the user to switch on and off the main power supply of the channel selection device 101 as well as to make various settings as needed.

As described above, the channel selection device 101 of this embodiment receives, selects, and demodulates TV broadcast signals. The demodulated TV broadcast signals are subjected to data compression before being sent out wirelessly in accordance with a predetermined communication protocol. Information supplied over the telephone line L is also received and decoded by the channel selection device 101. As with the TV broadcast signals, the decoded information is subjected to data compression before being sent out wirelessly in keeping with the communication protocol.

The channel selection unit 101 receives instruction information such as channel selection instructions transmitted wirelessly from the display device 102, to be described later in more detail. Given the instructions, the channel selection unit 101 performs corresponding processes. Transmitter information such as an e-mail sent from the display device 102 is transmitted to its destination by the channel selection unit 101 through the modem 210.

Figure 12:
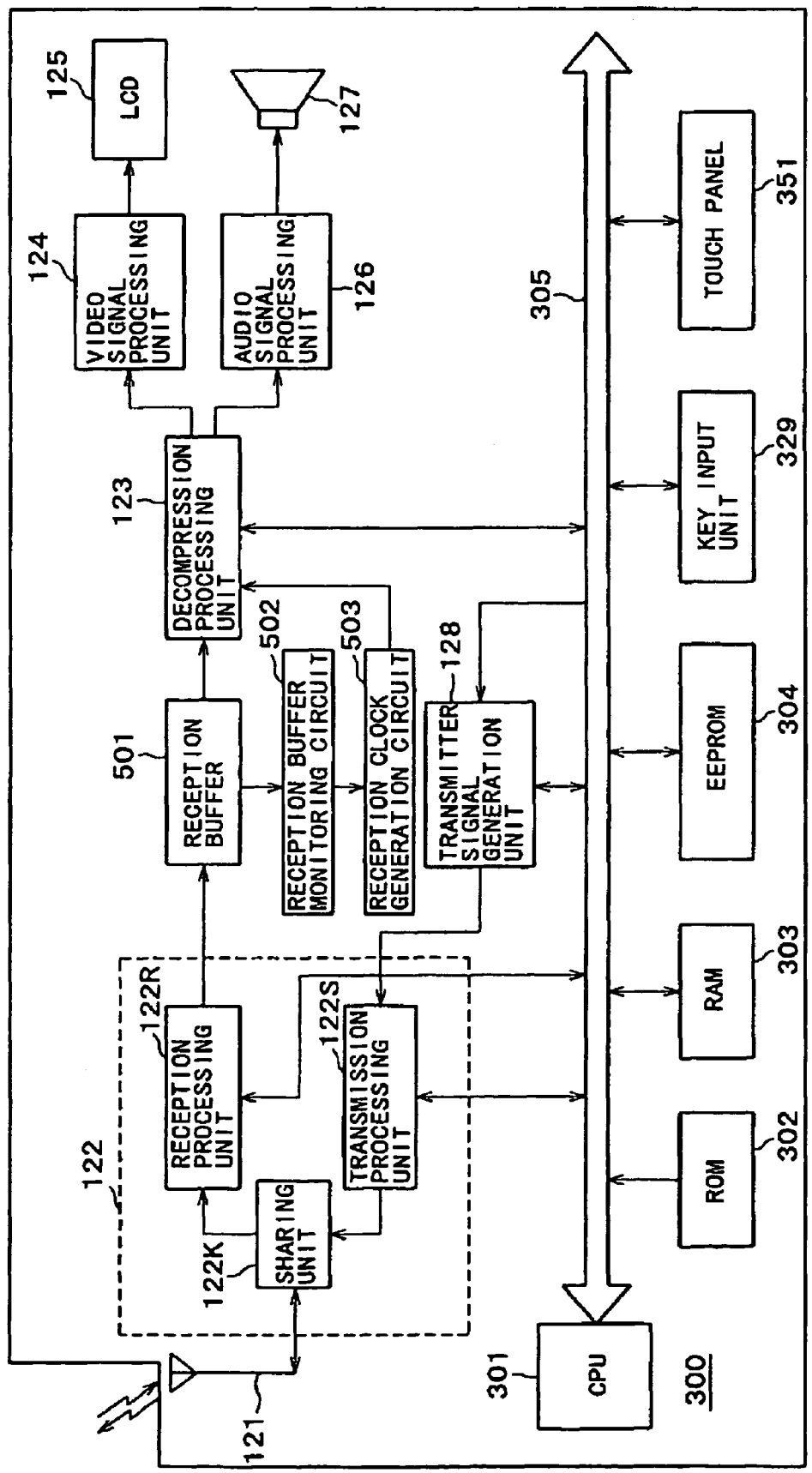
FIG. 12 is a block diagram depicting a typical structure of a display device included in the setup of FIG. 10.

The display device 102 to be connected wirelessly with the channel selection device 101 will now be described. FIG. 12 is a block diagram depicting a typical structure of the display device 102. The display device 102 is controlled by a control unit 300 which is a microcomputer having a CPU 301, a ROM 302, a RAM 303, and an EEPROM 304 interconnected by a CPU bus 305.

The ROM 302 retains various processing programs executed by the display device 102 as well as data needed for the program execution. The RAM 303 serves primarily as a work area in which the data acquired from various processes are held temporarily.

The EEPROM 304 is a nonvolatile memory that retains the information held therein even when power is removed. For example, various setting parameters, drafted e-mails and received e-mails may be stored in nonvolatile fashion in the EEPROM 304.

What follows is a description of how the display device 102 works when receiving wireless signals from the channel selection device 101. A wireless signal based on the predetermined communication protocol is received from the channel selection device 101 by way of a transmitter/receiver antenna 121. The received signal passes through a sharing unit 122K to enter a reception processing unit 122R. The reception processing unit 122R subjects the supplied signal to such processes as demodulation, before forwarding the processed signal to a decompression processing unit 123 via a reception buffer 501.

A reception buffer monitoring circuit 502 monitors the size of data in the reception buffer 501 and controls a reception clock generation circuit 503 in accordance with the buffered data size. Under control of the reception buffer monitoring circuit 502, the reception clock generation circuit 503 generates a reception clock with a frequency corresponding to the size of data being held in the reception buffer 501. The generated clock is supplied to the decompression processing unit 123. The decompression processing unit 123 carries out data decompression in synchronism with the received clock.

Because the channel selection device 101 compresses all signals before sending them out as described above, the decompression processing unit 123 of the display device 102 restores the original signal by decompressing the demodulated signal coming from the channel selection device 101. If the restored signal is a TV program signal, then the signal is composed of a video signal and an audio signal which are to be separated. The video signal is fed to a video signal processing unit 124 and the audio signal to an audio signal processing unit 126.

The video signal processing unit 124 creates a display signal out of the video signal coming from the decompression processing unit 123, and sends the created display signal to an LCD 125. The LCD 125 displays pictures reflecting the video signal sent wirelessly from the channel selection device 101. Meanwhile, the audio signal processing unit 126 turns the supplied signal into an audio signal to be fed to a speaker 127. Given the signal, the speaker 127 produces a sound corresponding to the audio signal transmitted wirelessly from the channel selection unit 101.

As described, the display device 102 receives TV broadcast programs and other signals sent wirelessly from the channel selection device 101. The video and audio signals contained in the received signal are reproduced and output by the display device 102 so that the user may enjoy or otherwise utilize what is being presented.

The series of steps and processes described above may be executed either by hardware or by software.

In this specification, the steps constituting the program to be stored on a recording medium and retrieved therefrom for execution represent not only the processes that are carried out in the depicted sequence (i.e., on a time series basis) but also processes that are conducted parallelly or individually.

In this specification, the term "system" refers to an entire configuration made up of a plurality of component devices.

INDUSTRIAL APPLICABILITY

This invention allows the transmitting and the receiving sides to synchronize the data being exchanged therebetween without recourse to having audio/video data packets equipped with time information. The invention also enables audio and video data to be synchronized as needed. This makes it possible to build an audio/video data transmission and reception system that operates in a stable manner without the use of MPEG transport stream packets or the like. In the inventive system, circuits for adding time-stamp information are not required on the transmitting side while the need for clock regeneration circuits is eliminated on the receiving side. Consequently, the scale of the component circuits involved is reduced significantly so that a low-cost system can implemented.

The invention claimed is:

1. A data processing apparatus comprising:
   receiving means for receiving data blocks in which an audio data item and a video data item are multiplexed;
   separating means for separating said received data into said audio data item and said video data item;
   first storing means for storing said audio data item;
   second storing means for storing said video data item;
   first processing means for decoding said audio data item;
   second processing means for decoding said video data item;
   generating means for generating first and second clocks of respective clock frequencies for use by said first and said second processing means;
   first controlling means for raising the clock frequency of said first clock if said audio data item stored in said first storing means is of a data size larger than a first reference value, said first controlling means lowering the clock frequency of said first clock if said audio data item stored in said first storing means is of a data size less than a second reference value; and
   second controlling means for raising the clock frequency of said second clock if said video data item stored in said second storing means is of a data size larger than a third reference value, said second controlling means lowering the clock frequency of said second clock if said video data item stored in said second storing means is of a data size less than a fourth reference value;
   wherein said first or second controlling means impart delay compensation to said audio or video data item to synchronize said data items if there is a difference in total processing time between transmission processing of the audio and video data items and reception processing of the audio and video data items.

2. A data processing method comprising the steps of:
   receiving data in which an audio data item and a video data item are multiplexed;
   separating said received data into said audio data item and said video data item;
   storing said audio data item;
   storing said video data item;
   processing said audio data item;
   processing said audio data item;
   generating first and second clocks of respective clock frequencies for use in processing said audio and video data items;
   raising the clock frequency of said first clock if said stored audio data item is of a data size larger than a first reference value, and lowering the clock frequency of said first clock if said stored audio data item is of a data size less than a second reference value;
   raising the clock frequency of said second clock if said stored video data item is of a data size larger than a third reference value, and lowering the clock frequency of said second clock if said stored video data item is of a data size less than a fourth reference value; and imparting delay compensation to said audio or video data item to synchronize said data items if there is a difference in total processing time between transmission processing of the audio and video data items and reception processing of the audio and video data items.

* * * * *